United States Patent [19]

Mallen-Herrero et al.

[11] Patent Number: 4,503,928
[45] Date of Patent: Mar. 12, 1985

[54] HYDRAULIC MOTOR AND HYDROSTATIC POWER TRANSMISSION USING SUCH MOTOR

[75] Inventors: José Mallen-Herrero, Paris; Daniel Leroy, Limay, both of France

[73] Assignee: Compagnie de Construction Mecanique Sulzer, Paris, France

[21] Appl. No.: 326,095

[22] Filed: Nov. 30, 1981

[30] Foreign Application Priority Data

Nov. 28, 1980 [FR] France ................................ 80 25332

[51] Int. Cl.³ .............................................. B60K 17/10
[52] U.S. Cl. ..................................... 180/308; 418/26; 180/165
[58] Field of Search ............... 180/308, 307, 305, 165; 417/25, 43, 220; 418/26, 28, 22, 217, 219, 24

[56] References Cited

U.S. PATENT DOCUMENTS

| | | | |
|---|---|---|---|
| 2,238,062 | 4/1941 | Kendrick | 418/26 |
| 2,418,123 | 4/1947 | Joy | 180/308 |
| 2,650,573 | 9/1953 | Hickman | 180/308 |
| 2,977,889 | 4/1961 | Fisk | 418/26 |
| 3,015,212 | 1/1962 | Krafft et al. | 418/26 |
| 3,153,984 | 10/1964 | Fikse | 418/24 |
| 3,250,223 | 5/1966 | Krawacki | 418/26 |
| 3,493,067 | 2/1970 | Rumsey | 180/308 |
| 3,604,823 | 9/1971 | Thomas | 418/26 |
| 3,734,225 | 5/1973 | Kobald et al. | 180/307 |
| 4,047,859 | 9/1977 | Sundberg | 418/217 |
| 4,111,618 | 9/1978 | Thibault | 180/308 |

FOREIGN PATENT DOCUMENTS

| | | | |
|---|---|---|---|
| 1130841 | 2/1957 | France | 418/26 |
| 1498399 | 10/1967 | France | 418/26 |

*Primary Examiner*—David M. Mitchell
*Attorney, Agent, or Firm*—Karl W. Flocks; Sheridan Neimark; A. Fred Starobin

[57] ABSTRACT

A hydraulic motor comprises vanes slidable axially in lodgings of a rotor against a continuous stator bottom surface. The motor works with a hydrostatic transmission of power applied to rolling stock. The bottom surface has recesses formed therein on movable elements of stator wherein a constant pilot pressure is fed to said movable elements and the motor is a self regulated variable capacity motor since the capacity thereof results from the depth of the recesses due to the opposition of two forces, one from the pilot pressure and the other from a pressure coming from the resisting torque.

19 Claims, 11 Drawing Figures

HIGH PRESSURE
LOW PRESSURE
PILOT PRESSURE
DRAINAGE

HYDRAULIC MOTOR AND HYDROSTATIC POWER TRANSMISSION USING SUCH MOTOR

This invention relates to a hydraulic motor having vanes axially sliding against a continuous stator bottom surface with recesses therein, said motor being insertable in a hydrostatic power transmission system applied more particularly but not exclusively to underground or aerial rolling stock, both on rails and roads.

In a U.S. patent application No. 201,935 filed by Mallen-Herrero et al on Oct. 29, 1980, the inventors have described a device in which the axially sliding vanes are considered in pairs with respect to an axis of symmetry in lodgings of the rotor, the vanes in each pair being disposed in alignment with one another such that the vanes each come into application against a different continuous stator bottom surface.

The continuous stator bottom surfaces may present a variable number of deformations or recesses with rectilinear areas suited to the desired operation of the device, such number being identical on each stator surface and the recesses being opposite to one another.

According to a form of embodiment of this U.S. patent application, the axially slidable vanes are disposed in pairs in rotor lodgings on either side of a central stator part, with the recesses being opposite back to back on either side of said central stator part and made thereon, and the vanes coming closer to one another to be applied on to the continuous recessed bottom surfaces of said central stator part.

According to another form of embodiment of the invention, a central stator part with bottom surfaces being provided on either side of a symmetrical axis is made integral with a section of fixed shaft, the rotor being then mounted in form of a cage around the stator.

In a U.S. patent application No. 277,316 filed by Mallen-Herrero et al on June 25, 1981, the inventors have described a hydraulic rotary device having coaxial stator and rotor and axially slidable vanes in the rotor, the stator comprising at least one bottom surface having a variable number of deformations or recesses with rectilinear areas suited to the operation, said vanes following said bottom surface, wherein said recesses are made on movable elements of the stator such that the depth of said recesses can be made variable thereby to provide a variable flow rate in the device.

In accordance with this invention, a constant pilot pressure is delivered behind said movable stator elements, the so realized hydraulic motor constituting a self-regulated variable capacity motor, with the capacity of the motor resulting from the depth of the recesses caused by the opposition of two forces on either side of each movable element, i.e. a force FP coming from said constant pilot pressure and a force FA coming from an active pressure produced by the resisting torque, the force FP causing reduction of the motor capacity whereas the force FA causes increase of said capacity such that the hydraulic motor works under constant pressure by variation of the capacity.

The movable elements can each have a central plate with each stator bottom surface comprising fixed areas between plates of the movable elements, said areas and said plates being planar thereby to permit a phase of operation in free wheeling during which said fixed areas and plates are aligned in respect to one another.

The invention also relates to a hydrostatic power transmission incorporating at least one hydraulic motor according to the invention.

Such a transmission comprises, apart from said motor, connected to a driven member, a main pump driven under constant operative conditions by a power source and providing a controlled high pressure variable flow rate required for the rotation of the hydraulic motor, said transmission also comprising a source of constant pilot pressure which is fed behind the movable stator elements such that the maximum flow rate of said pump at a constant pressure at the level of the power set up being reached, the hydraulic motor continues the increase of its speed under constant power, flow rate and pressure through automatic reduction of its capacity and torque.

The transmission may equip a vehicle and comprises valve means for the direction of running and as many hydraulic motors as there are wheels on said vehicle.

The transmission is in a closed circuit having a restoration device on the low pressure side, with the flow of the hydraulic circuit being always in the same direction in propulsion or braking, with the high pressure, in propulsion, reigning between the main pump and the hydraulic motors and the high pressure being cancelled in free wheeling.

In hold back or braking, the high pressure is situated between the hydraulic motors working as emitters or sources and the main pump working as receiver.

The flow rate of the main pump is controlled by using the boost pressure from an auxiliary pump to vary its capacity.

The transmission comprises a flow rate divider to divide the pressure flow of the pump into as many flow rates of identical value as there are wheels and therefore, motors.

The pilot pressure source is derived from the high pressure brought to the pilot pressure.

This invention has many advantages, in particular, the following:

The power requirement in propulsion is directly defined by the wheel proportionally to the desired torque and speed of rotation.

The energy consumption is very low at low speed and the start up periods.

The power source is utilized under constant operative conditions without any specific regulation requirements.

The transmission can brake the load with or without energy recovery, even during interruption of supply of electric current.

The transmission is adapted to an arrangement with independent wheels, while preventing any sliding and jamming effects.

The power regulation is controlled by the hydraulic motor.

The power source driving the pump rotates under its own operative conditions independently of those of the wheels.

The speed variations of the power source are automatically absorbed by the hydraulic motor without any effect on the rotation of the wheel.

When the vehicle equipped in accordance with the invention negotiates bends, each of the hydraulic motor modifies its capacity to respond to the desired speed as a function of one and the same flow rate attributed to each of them.

The pump and the hydraulic motors are perfectly balanced, and directly produce a torque or a flow rate without conversion of motions.

The hydraulic force is not supported by a mechanical piece in motion of the type: rolling abutment, universal joint, connecting rod, roller and the like.

The wear plays are automatically compensated for thereby to preserve the volumetric efficiency.

The solution in accordance with the invention requires a minimum flow rate to permit fluid speeds in the order of for instance 3 m/s in conduits of a small cross-section and hydraulic components of reduced size.

Apart from the operation under low pressure, thus at low fluid compression, the pump and the hydraulic motors, due to their design, are very little pulsatory.

Other characteristics and advantages of this invention will appear from the following description made in the light of the attached drawings, in which.

Figure 1:
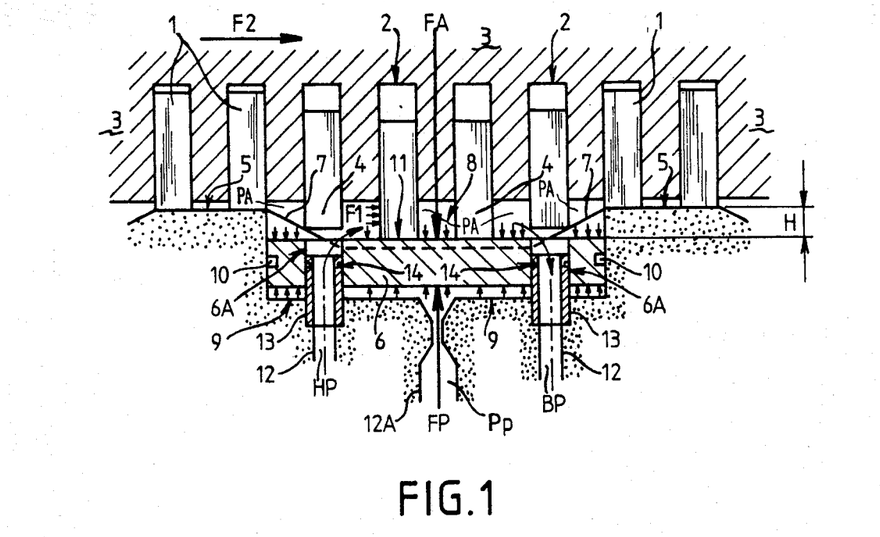
FIG. 1 is a developped cross-sectional view of part of a hydraulic motor in accordance with the invention.

In the form of embodiment shown in FIG. 1, of a hydraulic motor in accordance with the invention, axially slidable vanes 1 in lodgings 2 formed in a rotor 3 come to bear by at least one edge of their protruding head part 4 on a stator bottom surface having non permanent deformations or recesses. Such continuous stator surface is characterized by being composite in that it comprises both fixed areas 5 and movable portions or elements 6 that can make up, during the operation, recesses 8 by moving in lodgings 9 formed in the stator. Fixed ramps 7 provide connections between the fixed areas 5 and the stator lodgings 9. Sealing means 10 are provided between each movable element 6 and the corresponding stator lodging.

In the form of embodiment shown each movable element 6 comprises a central plate 11 forming the bottom of the recess when the latter is realized and disposed in the stator lodging 9 between two pairs of fixed stator ramps 7.

Both ramps in each pair functionally relay the central plate so as to ensure constant contact of the stator with all or part of the forward head portion of the vane 1 considered (or at least of all or part of an edge of such head portion), upon passage of the vane 1 from the fixed stator area 5 to reach the central plate 11. The constant contact is made partly with one edge partly with the other edge, with an intermediary flat passage where each vane shows for example a forward quadrangular head portion.

High pressure HP and low pressure BP circuits pass through the stator by channels 12 each extended in the lodgings 9 by plunging tubes 13 along which the movable elements 6 slide, with bores 6A being formed to this end in such movable elements. Sealing means 14 are disposed on the plunging tubes 13 between the bores 6A and those tubes. Such an arrangement is provided so that each recess 8 can communicate with a HP circuit and a BP circuit. A pilot pressure is admitted in accordance with the invention through a channel 12A behind each movable element 6, and the plunging tubes 13 isolate the HP and BP circuits from the pilot pressure $P_P$. The action of the fluid upon the vanes is indicated by the arrows F1 and the rotor motive power by the arrow F2.

The hydraulic motor thus realized can constitute a self-regulated variable capacity q motor. The motor capacity is determined by the depth H of the recesses 8 resulting from the opposition of two forces on either side of each movable element 6, i.e. a force FP coming from the constant pilot pressure $P_p$ and a force FA coming from an active pressure PA which is actually a pressure build-up in the active chamber caused by the resisting torque M. The force FP causes reduction of the capacity q of the motor, whereas the force FA, which is a resultant force of forces PA, causes increase in such capacity. This basic principle causes the hydraulic motor to operate at a constant pressure by variation of the capacity.

The hydraulic motor in accordance with the invention can be incorporated in a hydrostatic power transmission system, more particularly but not exclusively, applicable to rolling stock.

Figure 2:
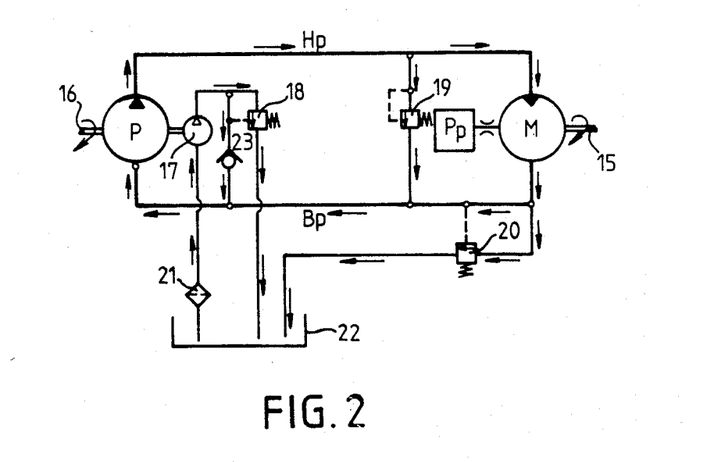
FIG. 2 is a diagram showing a basic transmission unit comprising a hydraulic motor in accordance with the invention.

Such transmission in principle comprises in accordance with the invention, apart from motor M connected to a driven member 15, and a pump driven by a power source 16 (for example an electric motor), a source of constant pilot pressure $P_p$, the latter being delivered behind the movable stator elements 6.

The pump driven by the power source supplies the high pressure HP flow rate required for the rotation of the hydraulic motor, the low pressure BP from the motor returning to the pump. This principle of transmission unit also comprises an auxiliary fixed flow rate boost and restoration pump 17, a boost pressure limiter 18, a high pressure limiter 19 and a purging and restoration pressure limiter 20. This unit is completed by a suction filter 21 from a tank 22 and by a non return valve 23, the restoration of oil taking place through such valve due to a pressure differential effect, i.e. boost pressure higher than low pressure higher than purging pressure.

The hydraulic motor M automatically adjusts its capacity q depending on the resisting torque $M$ and the constant operational pressure.

Figure 3:
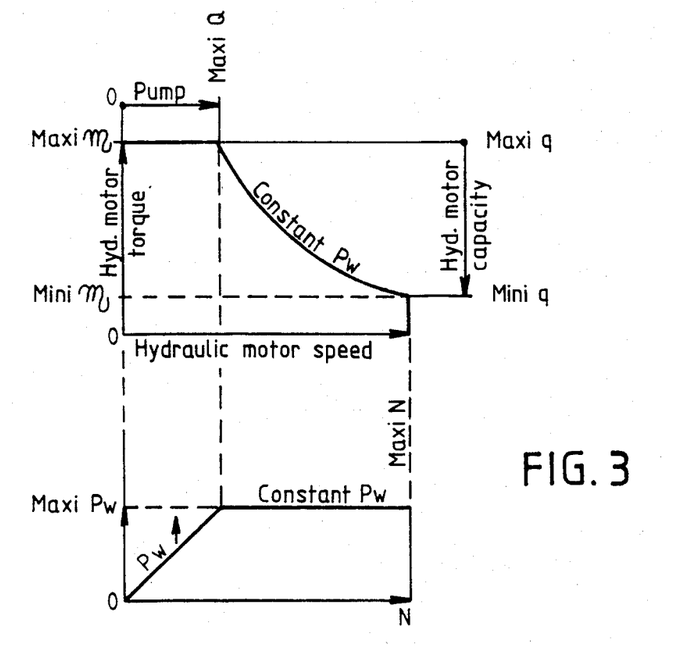
FIG. 3 shows two associated curves, i.e. a motor torque-motor speed curve and a power-motor speed curve.

The pump P with controlled variable flow rate rotates under constant operative conditions and reaches its maximum flow rate (maxi Q) at constant pressure at the level of the established power (FIG. 3).

The maximum flow rate of the pump being reached, the hydraulic motor continues to increase its speed N with constant power PW, flow rate and pressure, through automatic reduction of capacity q and torque m (FIG. 3).

To better apprehend the invention one should refer to the power curve of FIG. 3 of the drawings.

Definition of torques at constant pressure:

M maxi = Mr + Ma(maxi) = maximum cylinder capacity.

M mini = Mr + Ma(mini) = minimum cylinder capacity.

where:

Torque Mr is torque required for maintaining the speed of the member to be driven.

Torque Ma is torque required for acceleration of the member to be driven.

In operation:

The acceleration of the variable flow rate Q of the pump P causes maximum acceleration of the hydraulic motor with a maxi torque M.

The pump having reached its maxi flow rate Q corresponding to the set in power PW, the acceleration flow rate required for maxi torque M cannot be maintained; there results reduced hydraulic pressure due to reduction of maxi torque M. The principle on which the hydraulic motor according to the invention is based produces automatic reduction of its cylinder capacity to maintain the hydraulic pressure.

The pump then providing a constant maxi flow rate Q, the reduction of cylinder capacity of the hydraulic motor causes increase in its speed on the available power curve PW.

Formulae used are:

---

PW = power curve = maxi flow rate Q × constant pressure.

M = hydraulic motor torque = hydraulic motor MH cylinder capacity × constant pressure.

N = hydraulic motor speed = $\dfrac{\text{Maxi flow rate Q}}{\text{MH cylinder capacity}}$ i.e. $\dfrac{(\text{maxi flow rate Q})}{(\text{MH cylinder capacity})}$ × (MH cylinder capacity × constant pressure)

= maxi flow rate Q × constant pressure.

---

Figure 4:
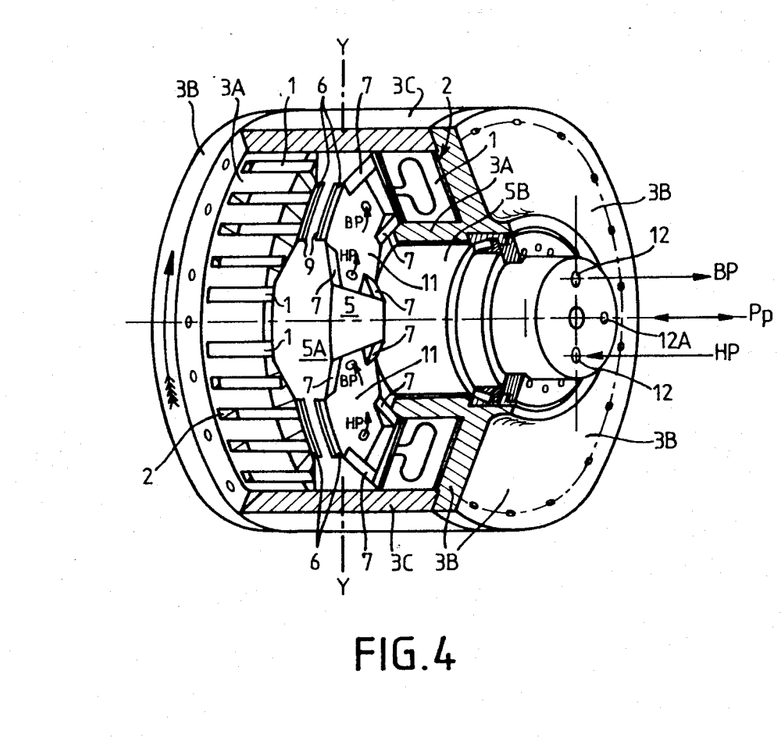
FIG. 4 is a perspective partly cross-sectional view of a form of embodiment of a hydraulic motor according to the invention.

In the form of embodiment shown in FIG. 4, a central stator piece 5A comprises bottom surfaces 5-11 on either side of a symmetrical axis Y—Y. Such central stator piece is made integral with a portion of fixed shaft 5B. The rotor is mounted to form a cage around the stator and comprises two central sections 3A on either part of the central stator piece 5A, in which sections lodgings 9 are formed, said rotor also comprising lateral disks 3B and a ring hoop 3C in form of a spacer between such disks.

It can be noted that in the form of embodiment of FIG. 1 as well as in the form of embodiment of FIG. 4, the fixed areas 5 of each stator bottom surface are planar in the same way as the plate 11 of the movable elements 6 of such bottom surface, thereby to permit a free wheeling operative phase as explained hereinafter during which such fixed areas 5 and such plates 11 are aligned with respect to one another, the recesses 8 being then no longer realized, hence the above expression reading : non permanent recesses 8.

Figure 5:
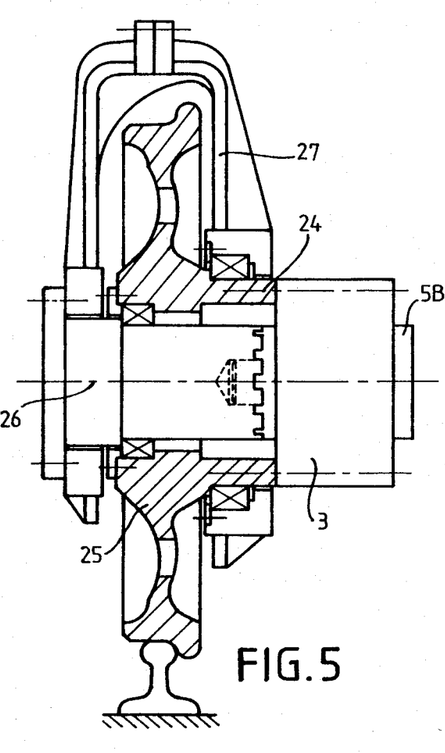
FIG. 5 represents a hydraulic motor according to the invention associated with a fixed axle of a wheel through its stator, and with the hub of said wheel through its outer rotor.

In the form of embodiment shown in FIG. 5, the outer rotor designated as a whole by reference numeral 3 of the hydraulic motor is advantageously coupled through a floating drive means 24 to a wheel 25 of rolling stock, in particular, railway stock.

The fixed axle 26 of the wheel to which the fixed shaft 5B of the motor is secured is supported on support means 27. The shaft 5B of the motor is formed with through-channels 12 for high and low pressures HP and BP and a through channel 12A for pilot pressure $P_p$.

A movable hydraulic transmission will be described hereinafter with respect to several operative phases, in the light of FIGS. 6–10, said transmission being based on the transmission principle of FIG. 2, having a closed circuit with the restoration arrangement being on the low pressure side. The direction of flow in the hydraulic circuit is always the same in propulsion and braking. The only reversal takes place between the valve means 30 for the direction of running and as many hydraulic motors M as there are wheels 25 on the vehicle considered.

In propulsion, the high pressure HP is situated between the main pump P and the hydraulic motor M to surmount the traction torque and in free wheeling the high pressure is cancelled.

The high pressure in hold back or braking is situated between the hydraulic motors operating as power sources and the main pump working as a receiver, so as to maintain the braking torque.

In propulsion (FIG. 6), the main pump P of variable flow rate and a single direction of flow is driven by the power source 16. Its flow rate is controlled from a control station by valve means 28, using the boost pressure to vary its capacity.

Figure 6:
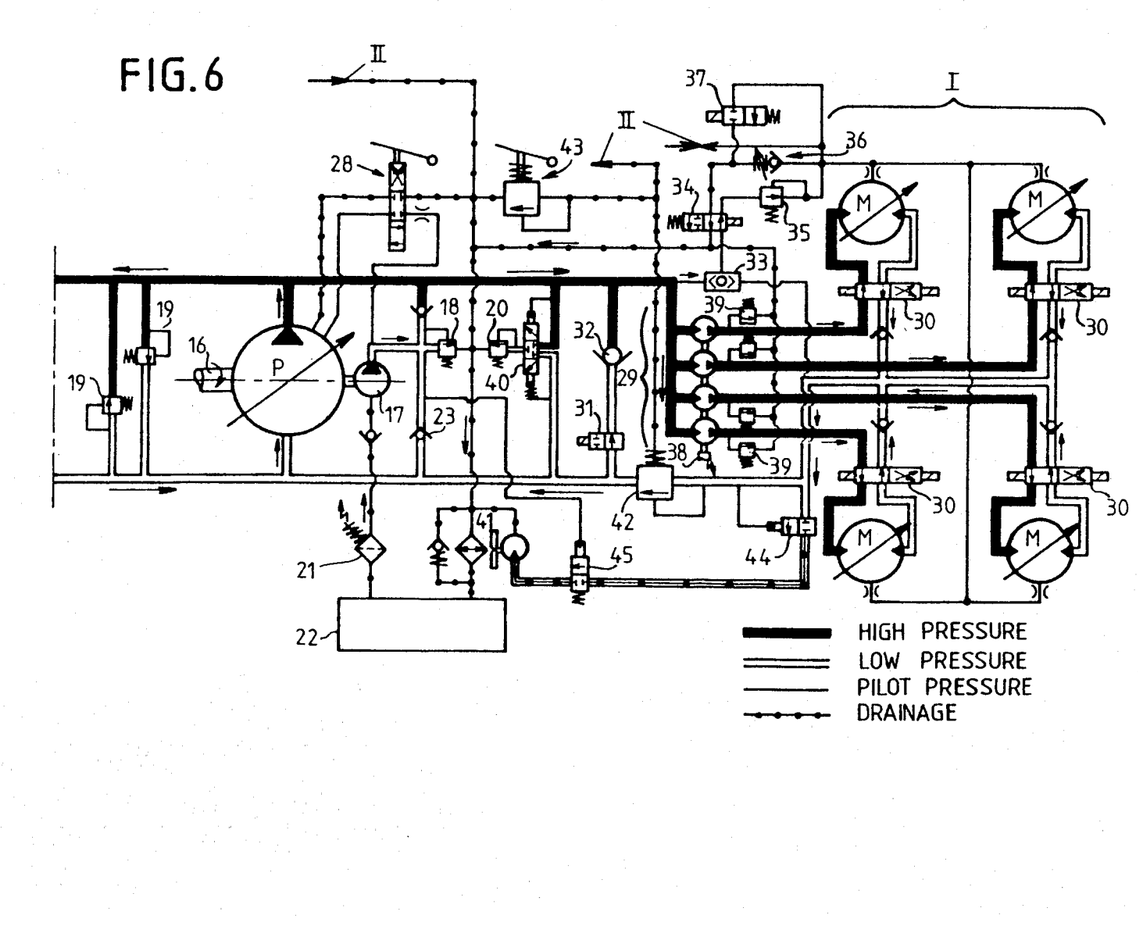
FIG. 6 is a diagram representing the operation of a transmission incorporating hydraulic motors according to the invention, in a propulsion phase permitting free wheeling, the diagram being accompanied by a fluid flow code.

The pump flow is forced in high pressure through conduits to a first bogie I and a second bogie II of the vehicle considered up to a flow rate divider 29 with four flowmeters on the same shaft with identical capacities to divide the flow into as many flows of identical value as there are wheels in each bogie, and therefore, motors.

Each flow is then led toward one of the direction of running valves 30 to feed one of the hydraulic motors M coupled to a bogie wheel to impart thereto its direction of rotation, depending on the direction of feed.

The low pressure fluid from the hydraulic motors M is led through a centralized conduit to the suction side of the main pump P.

The position of the direction of running valve means 30 is electrically controlled from the control station, in the braked position.

The hydraulic free wheeling phase in accordance with the invention (FIG. 6) is intended to inhibit any braking effect through reversal of the high pressure and the low pressure during the propulsion period. To this end, a valve means 31 for cancelling free wheeling is set to its open position and a free wheeling valve 32 is held closed by the high pressure during the propulsion. If the pressure is reversed, the valve 32 opens, thereby cancelling the high pressure and the hydraulic motors M then rotate by themselves.

The principle of operation of the self adjusted, variable capacity hydraulic motor according to the invention requires three constant proportional pressures:
the high pressure HP,
the low pressure BP,
and, the pilot pressure $P_p$.

The high pressure passes through a circuit selector 33 and is directed to valve means 34 for pilot control of the hydraulic motors, such valve means 34 being set to the open position (on and return). The high pressure upon which it is drawn is brought to the pilot pressure through a pressure reductor 35 and is held at the pilot pressure by means of a set valve or pressure limiter 36. Valve means 37 for cancelling the pilot pressure is set to its closed position.

The valve means 34 and 37 are brought to the pilot position by electric current supplied by an electric current generator or tachymetric dynamic 38 driven by the flow divider 29 of four flowmeters on the same shaft rotating under operative conditions N1.

Figure 7:
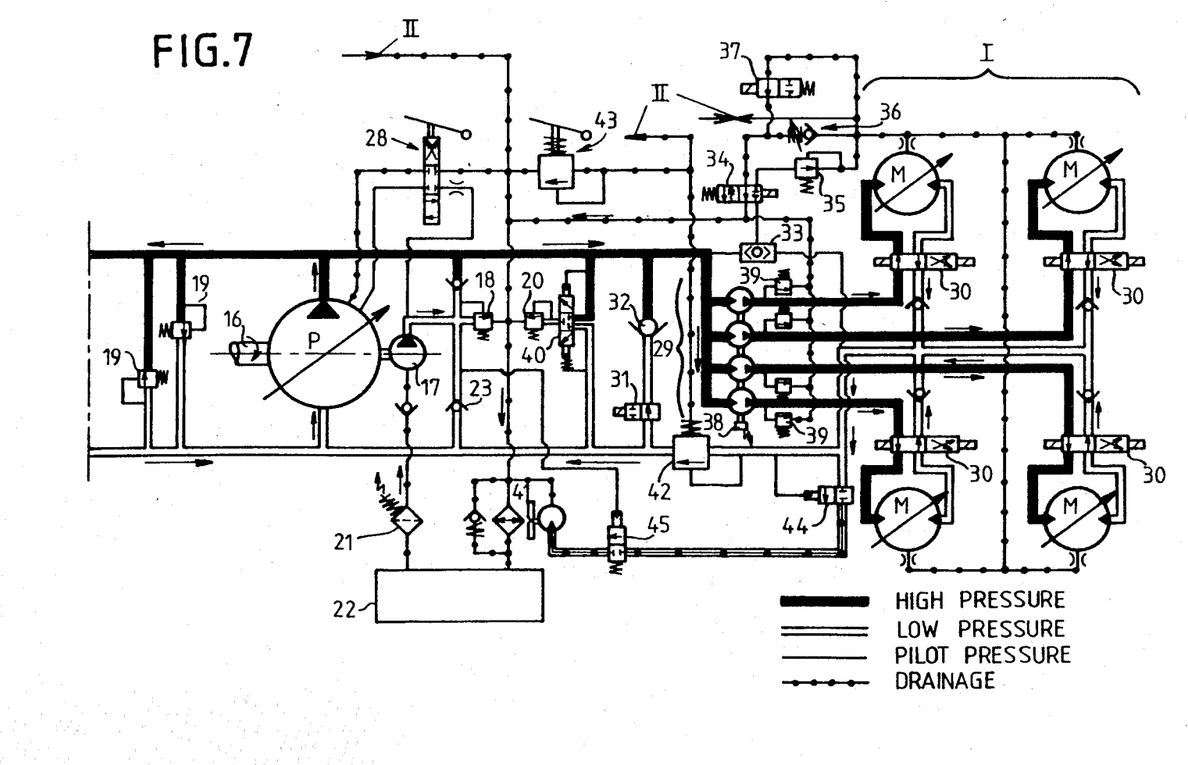
FIG. 7 is a diagram identical to that of FIG. 6 with a flow code, according to an operative phase corresponding to the start up without slippage.

Before reaching the operative conditions N1, the transmission is in the anti-skid position (FIG. 7). The pilot control valve means 34 is in the forward closed-return open position thereby cancelling the flow of high pressure. The pilot pressure cancelling valve means 37 is in the open position to suppress the pilot pressure. The hydraulic motors M have then a fixed maximum capacity and are caused to rotate as the same speed as each receives the same flow rate from the divider 29.

In the braking periods the flow divider 29 cancels the jam effects by causing the hydraulic motors to rotate, with all such motors receiving each one and the same flow rate.

The high pressure HP safety is ensured by means of two pressure limiters 19 which bring the main pump P into a closed circuit. The flow divider 29 is also provided with pressure limiters 39 to remedy the respective power transfers between the wheels.

Restoration of oil is realized in low pressure by means of a circuit selector 40 hydraulically controlled by the high pressure to let passage to the low pressure. The fluid from such selector 40 flow through the restoration and purge pressure limiter 20 to maintain the low pressure. The fluid is then led to the tank 22 through a cooling device 41, e.g. an air refrigerating device.

The volume of oil thus withdrawn from the circuit is replaced by an equal cooled volume from the tank 22 sucked through the filter 21 by the boost pump 17 driven by the power source 16, and driving in to the low pressure circuit through a selective valve device. The boost pressure is produced by the pressure limiter 18 (boost pressure higher than the low pressure higher than the restoration pressure).

In the braking phase with energy recovery (FIG. 8), the motors M are continuously hydraulically connected to the main pump P. The free wheeling valve 32 is neutralized by bringing the free wheeling cancellation valve means 31 to the closed position.

Figure 8:
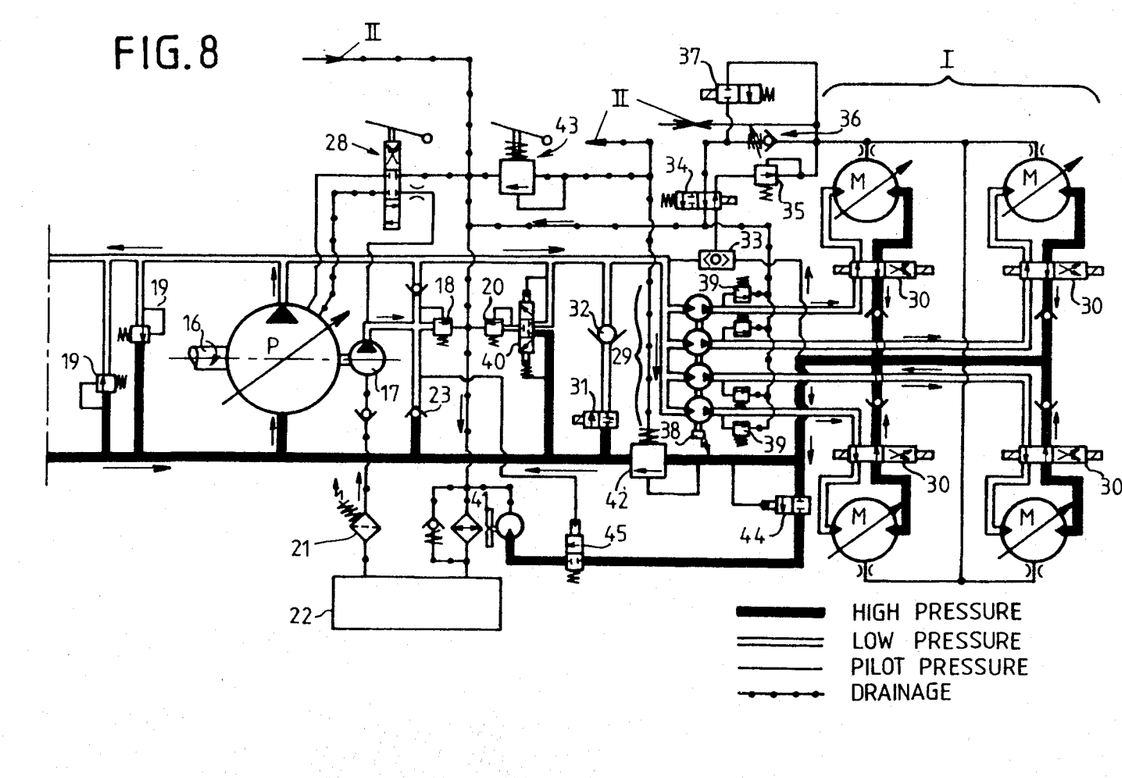
FIG. 8 is a diagram identical to that of FIG. 6 with its flow code according to an operative phase corresponding to braking with energy recovery.

The hydraulic motors M driven by the inertia of the vehicle force the fluid to the main pump P to make it work as a receiver. Upon controlled decrease of capacity of the main pump P, the force fluid increases its pressure thereby applying a braking torque to the hydraulic motors M and driving the main pump P and the power source 16 working then as an electric current generator.

The braking being done, the electric current can be returned to the network or any other electric current supply.

In the braking phase without energy recovery (FIG. 9), the pressure increase in the fluid forced by the hydraulic motors M is caused by a brake pressure metering means 42 hydraulically controlled by a brake pressure limiter 43 controlled from the control station.

Figure 9:
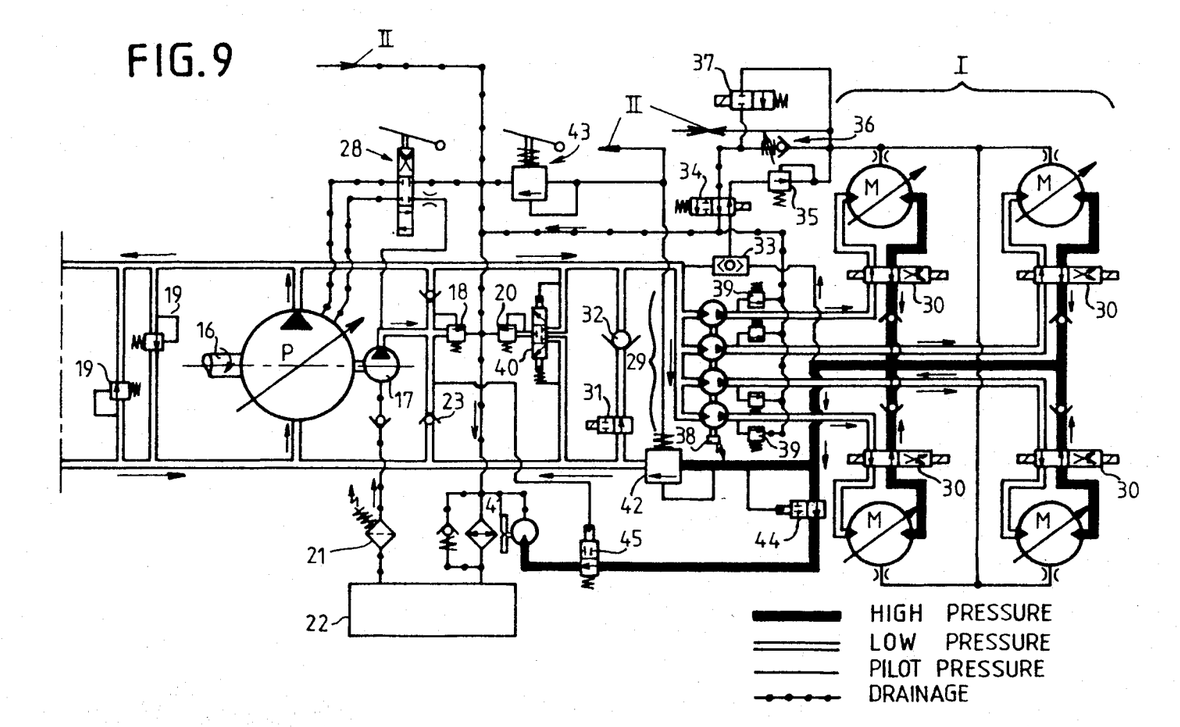
FIG. 9 is a diagram identical to that of FIG. 6 with its flow code, according to an operative phase corresponding to braking without energy recovery.
Figure 10:
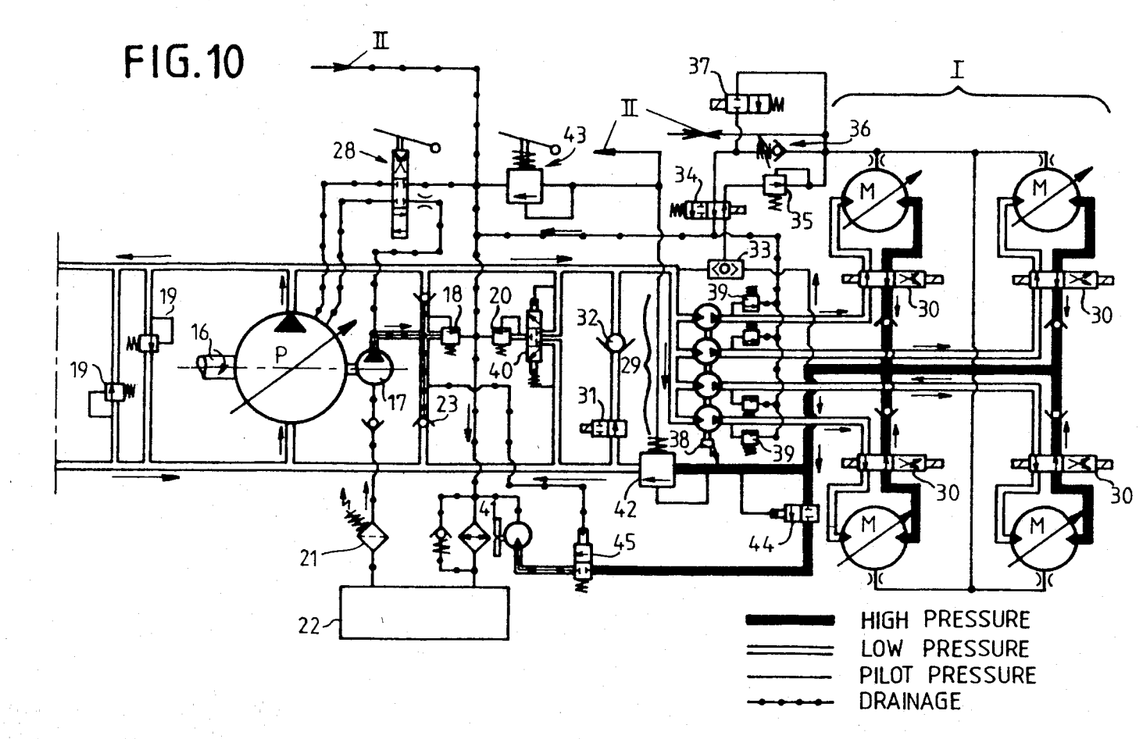
FIG. 10 is a diagram identical to that of FIG. 6 with its flow code, according to an operative phase corresponding to braking with the power group being stopped.

The free wheeling cancellation valve means 31 is in the open position and the free wheeling valve 32 permits return of the fluid directly to the hydraulic motors by insulating the main pump P therefrom.

In the mixed braking phase with the device being in the energy recovery braking position, part of the power can be held by the braking metering means 42 to modulate energy recovery in the main pump P.

Cooling of the fluid only occurs during the braking periods. The increase in the driving pressure of the hydraulic motors M brings a cooling control valve means 44 to its open position. A cooling cancellation control valve means 45 is held open by means of the boost pressure. A portion of the force fluid is then derived to the hydraulic motor of the cooling device 41 driving the fan of such device.

In braking phase, and the power group being stopped, e.g. due to current interruption (FIG. 10), the conditions are the same as during braking without recovery of energy, except that the cooling cancellation valve means 45 is in its closed position due to the lack of boost pressure so that the hydraulic circuit may not be emptied. The hydraulic circuit is not supplied again.

Due to the lack of adherence or through power cut off, the resisting torque applied to a wheel might suddenly fall. For a given constant flow rate, such torque fall automatically results in a decreased high pressure HP of the hydraulic motor.

The motion of the movable elements 6 being of a limited speed so as to create progressive variation in the capacity, in accordance with the invention, a sudden fall of the resisting torque causes the motion speed of the movable elements 6 to be higher than that initially determined. Due to this speed differential, the high pressure HP can no longer be maintained and a pressure variation $\Delta P$ is produced between both high pressures HP of both hydraulic motors of one and the same axle.

For one axle (FIG. 11) the pilot pressure $P_p$ controlling the capacity of the hydraulic motors flows through a selective valve means 46 piloted by the high pressures HP. Beyond a pressure variation $\Delta P$ of the high pressures HP as required for negotiating a bend such valve means cut off the pilot supply to the hydraulic motor with falling torque thereby to prevent racing thereof due to the fall in its capacity.

Figure 11:
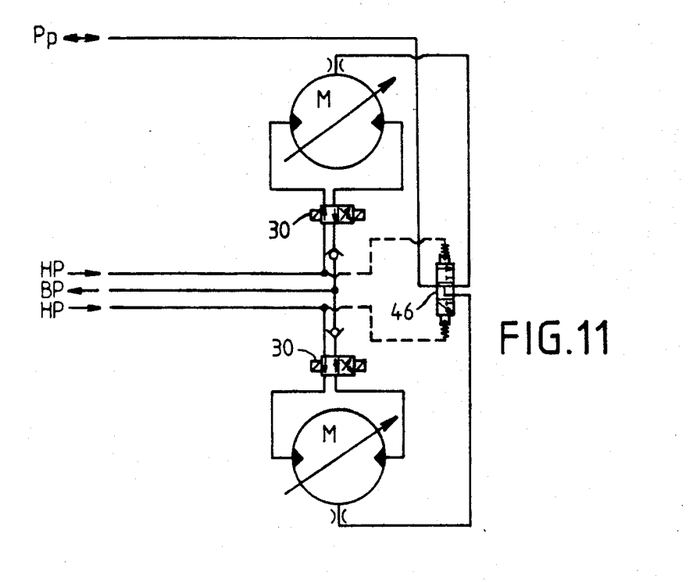
FIG. 11 shows an alternative form of part of the diagram of the transmission of FIGS. 6 to 10.

The selective valve means is again balanced upon return of the resisting torque of the wheel supplying such hydraulic motor with pilot pressure.

It will be understood that this invention was only described and represented in preferential exemplifying forms of embodiment and that equivalent parts can be substituted for its constitutive elements with departing from its scope.

We claim:

1. A hydrulic motor usable with a hydrostatic power transmission applied to underground or aerial rolling stock, both on rails and roads comprising
a stator having a continuous bottom surface with recesses,
a rotor having lodgings therein, vanes axially slidable in said rotor lodgings against said continuous bottom surface, said stator having movable elements forming said recesses, means to deliver a constant pilot pressure behind said stator movable elements to reduce the capacity of the motor, means to produce an active pressure increased by the resisting torque of a load between said rotor and said movable elements of said stator whereby the force of the active pressure will overcome the force of the pilot pressure to increase the capacity of the motor including said vanes and said movable elements with motor capacity determined by the depth of said recesses, the motor being self-regulated of variable capacity working at constant pressure through variations of its capacity.

2. A hydraulic motor as claimed in claim 1, comprising channels formed in said stator for the high pressure and low pressure circuits, plunging tubes extending each of said channels into said stator lodgings, said movable elements sliding along said plunging tubes and a channel admitting said pilot pressure behind each of said movable elements, and said plunging tubes insulating said high pressure and low pressure circuits from said pilot pressure.

3. A hydraulic motor as claimed in claim 1, wherein said hydraulic motor is of the type comprising a fixed shaft and a central stator part with bottom surfaces on either side of a symmetrical axis, said central stator part being made integral with a portion of said fixed shaft, said rotor being mounted in form of a cage around said stator.

4. A hydraulic motor as claimed in claim 1, wherein said movable elements each present a central plate and wherein each of said stator bottom surface comprises fixed areas, said areas and said plates being planar, thereby providing an operation phase in free wheeling during which said fixed areas and said plates are aligned with one another.

5. A hydraulic motor as claimed in claim 1, wherein the motor comprises a fixed shaft and wherein said rotor is externally mounted and coupled to a wheel of rolling stock, a fixed axle of the wheel being integral with said fixed shaft which is crossed through by high pressure and low pressure channels and by a pilot pressure channel.

6. A hydrostatic power transmission for vehicle wheels incorporating at least one hydraulic motor for each vehicle wheel as such motor is claimed in claim 1, comprising in addition to said motor, a power source, a pump driven under constant working conditions by said power source and providing a variable controlled high pressure rate as required for the rotation of said hydraulic motor, said transmission also comprising a constant pilot pressure source, which is delivered behind said movable stator elements such that the maximum flow rate of said pump at constant pressure at the level of the established power being reached, said hydraulic motor continues to increase its speed at constant power, flow rate and pressure through automatic reduction of its capacity and torque.

7. A hydrostatic power transmission for vehicle wheels incorporating as many hydraulic motors as claimed in claim 1 as there are wheels on the vehicle considered, comprising, in addition to said motors, a power source, a pump driven under constant operative conditions by said power source and delivering a variable controlled high pressure flow rate as required for the rotation of said hydraulic motors, said transmission also comprising a source of constant pilot pressure which is delivered behind said movable stator elements such that the maximum flow rate of said pump at constant pressure at the level of the established power being reached, each hydraulic motor continues to increase its speed at constant power, flow rate and pressure through automatic reduction of its capacity and torque.

8. A hydrostatic power transmission for vehicle wheels, incorporating as many hydraulic motors as claimed in claim 1, as there are wheels on the vehicle considered, comprising, apart from said motors, direction of running valve means, a power source, a main pump driven under constant operative conditions by said power source and delivering a controlled variable high pressure flow rate as required for the rotation of said hydraulic motors, said transmission also comprising a constant pilot pressure source, which is delivered behind said movable stator elements such that the maximum flow rate of said main pump at constant pressure at the level of the established power being reached, each hydraulic motor continues to increase its speed at constant power, flow rate and pressure through automatic reduction of its capacity and torque, said hydrostatic transmission being in a closed circuit, with restoration means on the low pressure side, the direction of the hydraulic flow circuit being always the same both in propulsion and hold back, means for propulsion, free wheeling and braking connected to said hydraulic motors, the high pressure in propulsion being situated between said main pump and said hydraulic motors and said high pressure being cancelled in free wheeling, the high pressure being situated in hold or braking between said hydraulic motors working as power sources and said main pump working as a receiver.

9. A hydrostatic power transmission for vehicle wheels, incorporating as many hydraulic motors as claimed in claim 1, as there are wheels on the vehicle considered, comprising, apart from said motors, direction of running valve means, a power source, a main pump driven under constant operative conditions by said power source and delivering a controlled variable high pressure flow rate as required for the rotation of said hydraulic motors, said transmission also comprising a constant pilot pressure source, which is delivered behind said movable stator elements such that the maximum flow rate of said main pump at constant pressure at the level of the established power being reached, each hydraulic motor continues to increase its speed at constant power, flow rate and pressure through automatic reduction of its capacity and torque, said hydrostatic transmission being in a closed circuit, with restoration means on the low pressure side, the direction of the hydraulic flow circuit being always the same both in propulsion and hold back, means for propulsion, free wheeling and braking connected to said hydraulic motors, the high pressure in propulsion being situated between said main pump and said hydraulic motors, and said high pressure being cancelled in free wheeling, the high pressure being situated in hold or braking between said hydraulic motors working as power sources and said main pump working as a receiver; said transmission also comprising an auxiliary pump with fixed boost and restoration flow rate, a boost pressure limiter, a high pressure limiter and a purge and restoration limiter, said transmission being completed by an aspiration filter from a tank and by a non-return check valve, and restoration of oil being made through said non return valve.

10. A hydrostatic power transmission for vehicle wheels, incorporating as many hydraulic motors as claimed in claim 1, as there are wheels on the vehicle considered, comprising, apart from said motors, direction of running valve means, a power source, a main pump driven under constant operative conditions by said power source and delivering a controlled variable high pressure flow rate as required for the rotation of the hydraulic motors, said transmission also comprising a constant pilot pressure source, which is delivered behind said movable stator elements such that the maximum flow rate of said main pump at constant pressure at the level of the established power being reached, each hydraulic motor continues to increase its speed at constant power, flow rate and pressure through automatic reduction of its capacity and torque, said hydrostatic transmission being in a closed circuit, with restoration means on the low pressure side, the direction of the hydraulic flow circuit being always the same both in propulsion and hold back, means for propulsion, free wheeling and braking connected to said hydraulic motors, the high pressure in propulsion being situated between the main pump and said hydraulic motors and said high pressure being cancelled in free wheeling, the high pressure being situated in holdback or braking between said hydraulic motors working as power sources and said main pump working as a receiver; said transmission comprising moreover valve means controlling the flow rate of said main pump by using a boost pressure to vary the capacity.

11. A hydrostatic power transmission for vehicle wheels, incorporating as many hydraulic motors as claimed in claim 1, as there are wheels on the vehicle considered, comprising, apart from said motors, direction of running valve means, a power source, a main pump working under constant operative conditions by said power source and delivering a controlled variable high pressure flow rate as required for the rotation of said hydraulic motors, said transmission also comprising a constant pilot pressure source, which is delivered behind said movable stator elements such that the maximum flow rate of said main pump at constant pressure at the established power being reached, each motor continues to increase it speed at constant power, flow rate and pressure through automatic reduction of its capacity and torque, said hydrostatic transmission being in a closed circuit, with restoration means on the lower pressure side, the direction of the hydraulic flow circuit being always the same both in propulsion and hold back, means for propulsion, free wheeling and braking connected to said hydraulic motors, the high pressure in propulsion being situated between said main pump and said hydraulic motors, and said high pressure being cancelled in free wheeling, the high pressure being situated in hold back or braking between said hydraulic motors working as power sources and said main pump working as a receiver; said transmission also comprising a flow rate divider to divide the high pressure flow rate of the pump into as many flow rates of identical value as there are wheels and thus, motors.

12. A hydrostatic power transmission for vehicle wheels, incorporating as many hydraulic motors as claimed in claim 1, as there are wheels on the vehicle considered, comprising apart from said motors, direction of running valve means, a power source, a main pump driven under constant operative conditions by said power source and providing a controlled variable high pressure flow rate as required for the rotation of said hydraulic motors, said transmission also comprising a constant pilot pressure source, which is delivered behind said movable stator elements such that the maximum flow rate of said main pump at a constant pressure at the level of the established power being reached, each hydraulic motor continues to increase its speed at constant power, flow rate and pressure through automatic reduction of its capacity and torque, said hydrostatic transmission being in a closed circuit, with restoration means on the lower pressure side, the direction of the hydraulic flow circuit being always the same both in propulsion and hold back, means for propulsion, free wheeling and braking connected to said hydraulic motors, the high pressure in propulsion being situated between said main pump and said hydraulic motors and said high pressure being cancelled in free wheeling, the high pressure being situated in hold back or braking between said hydraulic motors working as power souces and said main pump working as a receiver; said transmission also comprising a free wheeling cancellation valve means and a free wheeling valve, said cancellation valve means having means to bring it to its open position from a closed position and said free wheeling valve being maintained closed by the high pressure during propulsion in such a way that in the case of reversal of the high pressure, and the low pressure, said free wheeling valve opens thereby to cancel the high pressure, said hydraulic motors then rotating as free wheels.

13. A hydrostatic power transmission for vehicle wheels, incorporating as many hydraulic motors as claimed in claim 1, as there are wheels on the vehicle considered, comprising, apart from said motors, direction of running valve means, a power source, a main pump driven under constant operative conditions by said power source and delivering a controlled variable high pressure flow rate as required for the rotation of said hydraulic motors, said transmission also comprising a constant pilot pressure source, which is delivered behind said movable stator elements such that the maximum flow rate of said main pump at constant pressure at the level of the established power being reached, each hydraulic motor continues to increase its speed at constant power, flow rate and pressure through automatic reduction of its capacity and torque, said hydrostatic transmission being in a closed circuit, with restoration means on the low pressure side, the direction of the hydraulic flow circuit being always the same both in propulsion and hold back, means for propulsion, free wheeling and braking connected to said hydraulic motors, the high pressure in propulsion being situated between said main pump and said hydraulic motors, and said high pressure being cancelled in free wheeling, the high pressure being situated in hold back or braking between said hydraulic motors working as power sources and said main pump working as a receiver; said transmission also comprising a circuit selector receiving the high pressure to direct it to a pilot control valve means for said hydraulic motors.

14. A hydrostatic power transmission for vehicle wheels, incorporating as many hydraulic motors as claimed in claim 1, as there are wheels on the vehicle considered, comprising, apart from said motors, direction of running valve means, a power source, a main pump driven under constant operative conditions by said power source and delivering a controlled high pressure variable flow rate as required for the rotation of said hydraulic motors, said transmission also comprising a constant pilot pressure source, which is delivered behind said movable stator elements such that the maximum flow rate of said main pump at constant pressure at the level of the established power being reached, each hydraulic motor continues to increase its speed at constant power, flow rate and pressure through automatic reduction of its capacity and torque, said hydrostatic transmission being in a closed circuit, with restoration means on the low pressure side, the direction of the hydraulic flow circuit being always the same both in propulsion and hold back, means for propulsion, free wheeling and braking connected to said hydraulic motors, the high pressure in propulsion being situated between said main pump and said hydraulic motors, and said high pressure being cancelled in free wheeling, the high pressure being situated in hold back or braking between said hydraulic motors working as power sources and said main pump working as a receiver; said transmission also comprising a circuit selector receiving the high pressure to direct it to a pilot control valve means for said hydraulic motors; said transmission also comprising a pressure reductor permitting to bring the high pressure to said pilot pressure, and a pressure limiter to maintain said pilot pressure.

15. A hydrostatic power transmission for vehicle wheels, incorporating as many hydraulic motors as claimed in claim 1, as there are wheels on the vehicle considered, comprising, apart from said motors, direction of running valve means, a power source, a main pump driven under constant operative conditions by said power source and delivering a controlled high pressure variable flow rate as required for the rotation of said hydraulic motors, said transmission also comprising a constant pilot pressure source, which is delivered behind said movable stator elements such that the maximum flow rate of said main pump at constant pressure at the level of the established power being reached, each hydraulic motor continues to increase its speed at constant power, flow rate and pressure through automatic reduction of its capacity and torque, said hydrostatic transmission being in a closed circuit, with restoration means on the low pressure side, the direction of the hydraulic flow circuit being always the same both in propulsion and hold back, means for propulsion, free wheeling and braking connected to said hydraulic motors, the high pressure in propulsion being situated between said main pump and said hydraulic motors, and said high pressure being cancelled in free wheeling, the high pressure being situated in hold back or braking between said hydraulic motors working as power sources and said main pump working as a receiver; said transmission also comprising a circuit selector receiving the high pressure to direct it to a pilot control valve means for said hydraulic motors; said transmission also comprising a pressure reductor permitting to bring the high pressure to said pilot pressure, and a pressure limiter to maintain said pilot pressure; said transmission further comprising a pilot pressure cancellation valve means, said valve means for cancellation of pilot pressure and said pilot control valve means being brought to the pilot position by electric current from a generator driven by a flow rate divider rotating under given operative conditions, said transmission being in an anti-skid position before reaching said conditions.

16. A hydrostatic power transmission for vehicle wheels, incorporating as many hydraulic motors as claimed in claim 1, as there are wheels on the vehicle considered, comprising, apart from said motors, direction of running valve means, a power source, a main pump working under constant operative conditions by said power source and providing a controlled variable high pressure flow rate as required for the rotation of said hydraulic motors, said transmission also comprising a constant pilot pressure source, which is delivered behind said movable stator elements such that the maximum flow rate of said main pump at constant pressure at the level of the established power being reached, each motor continues to increase its speed at constant power, flow rate and pressure through automatic reduction of its capacity and torque, said hydrostatic transmission being in a closed circuit, with restoration means on the low pressure side, the direction of the hydraulic flow circuit being always the same both in propulsion and hold back, means for propulsion, free wheeling and braking connected to said hydraulic motors, the high pressure in propulsion being situated between said main pump and said hydraulic motors, and said high pressure being cancelled in free wheeling, the high pressure being situated in hold back or braking between said hydraulic motors working as power sources and said main pump working as a receiver; said transmission also comprising a flow rate divider to divide up the high pressure flow rate of the pump into as many flow rates of identical value as there are wheels, and thus, motors; said flow rate divider which cancels the jam effects during the braking periods being also provided with a pressure limiter to compensate for the power transfers of the wheels between one another.

17. A hydrostatic power transmission for vehicle wheels, incorporating as many hydraulic motors as claimed in claim 1, as there are wheels on the vehicle considered, comprising, apart from said motors, direction of running valve means, an electrical power source, a main pump driven under constant operative conditions by said power source and delivering a controlled variable high pressure flow rate as required for the rotation of said hydraulic motors, said transmission also comprising a constant pilot pressure source, which is delivered behind said movable stator elements such that the maximum flow rate of said main pump at constant pressure at the level of the established power being reached, each hydraulic motor continues to increase its speed at constant power, flow rate and pressure through automatic reduction of its capacity and torque, said hydrostatic transmission being in a closed circuit, with restoration means on the low pressure side, the direction of the hydraulic flow circuit being always the same both in propulsion and hold back, means for propulsion, free wheeling and braking connected to said hydraulic motors, the high pressure in propulsion being situated between said main pump and said hydraulic motors and said high pressure being cancelled in free wheeling, the high pressure being situated in hold back or braking between said hydraulic motors working as power sources and said main pump working as a receiver; with a controlled reduction of the capacity of said main pump resulting from braking or the driving of said hydraulic motors by inertia of the vehicle, with fluid being forced toward said main pump, permitting increased pressure in said forced fluid producing a hold back torque at said hydraulic motors and the driving of said main pump and said power source, which then operates as an electric current generator thereby to produce braking with energy recovery.

18. A hydrostatic power transmission for vehicle wheels, incorporating as many hydraulic motors as claimed in claim 1, as there are wheels on the vehicle considered, comprising, apart from said motors, direction of running valve means, a power source, a main pump driven under constant operative conditions by said power source and furnishing a controlled variable high pressure flow rate as required for the rotation of said hydraulic motors, said transmission also comprising a constant pilot pressure source, delivered behind said movable stator elements such that the maximum flow rate of said main pump at constant pressure at the level of the established power being reached, each hydraulic motor continues to increase its speed at constant power, flow rate and pressure through automatic reduction of its capacity and torque, said hydrostatic transmission being in a closed circuit, with restoration means on the low pressure side, the direction of the hydraulic flow circuit being always the same both in propulsion and hold back, means for propulsion, free wheeling and braking connected to said hydraulic motors, the high pressure in propulsion being situated between said main pump and said hydraulic motors and said high pressure being cancelled in free wheeling, the high pressure being situated in hold back or braking between said hydraulic motors working as power sources and said main pump working as a receiver; said transmission further comprising a braking pressure metering means, hydraulically piloted by a braking pressure limiter permitting, in the braking phase without energy recovery, increase of pressure in the fluid forced by said hydraulic motors.

19. A hydrostatic power transmission for vehicle wheels incorporating at least one hydraulic motor for each vehicle wheel as such motor is claimed in claim 1, comprising in addition to said motor, a power source, a pump driven under constant working conditions by said power source and providing a variable controlled high pressure flow rate as required for the rotation of said hydraulic motor, said transmission also comprising a constant pilot pressure source, which is delivered behind said movable stator elements such that the maximum flow rate of said pump at constant pressure at the level of the established power being reached, said hydraulic motor continues to increase its speed at constant power, flow rate and pressure, through automatic reduction of its capacity and torque; said transmission also comprising a selective valve means piloted by said high pressures of at least one pair of hydraulic motors and crossed through by said pilot pressure so as to cut off pilot feed to the hydraulic motor having a sudden fall in torque resulting from a lack of adherence or from power cut off thereby to prevent racing of the said motor due to the fall in its capacity.

* * * * *